(12) United States Patent
Kolupaev et al.

(10) Patent No.: US 11,055,714 B2
(45) Date of Patent: *Jul. 6, 2021

(54) METHODS, SYSTEMS, AND ARTICLES OF MANUFACTURE FOR FINGERPRINTING SIGNATURES AND ENHANCED SIGNATURE CAPTURING FOR CHARGE CARD TRANSACTIONS ON MOBILE COMMUNICATION DEVICES

(71) Applicant: Intuit Inc., Mountain View, CA (US)

(72) Inventors: Sergey Kolupaev, Folsom, CA (US); Sergey Aldoukhov, Rancho Cordova, CA (US); Alexander V. Chumikov, Fair Oaks, CA (US); Eugene O. Bochkarev, Folsom, CA (US); Timofey Beschastnov, Folsom, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,563

(22) Filed: Dec. 3, 2019

(65) Prior Publication Data

US 2020/0104856 A1 Apr. 2, 2020

Related U.S. Application Data

(63) Continuation of application No. 14/306,151, filed on Jun. 16, 2014, now Pat. No. 10,504,117.

(51) Int. Cl.
*G06Q 20/40* (2012.01)
*G06Q 20/32* (2012.01)
(Continued)

(52) U.S. Cl.
CPC ... *G06Q 20/40145* (2013.01); *G06K 9/00174* (2013.01); *G06K 9/00194* (2013.01);
(Continued)

(58) Field of Classification Search
CPC ......... G06Q 20/40145; G06Q 2220/00; G06Q 20/40; G06Q 20/36; H04L 63/0861; H04L 9/0866
See application file for complete search history.

(56) References Cited

U.S. PATENT DOCUMENTS

| | | |
|---|---|---|
| 8,020,763 B1 | 9/2011 | Kowalchyk et al. |
| 8,297,501 B1 | 10/2012 | Kowalchyk et al. |

(Continued)

FOREIGN PATENT DOCUMENTS

| | | | |
|---|---|---|---|
| WO | WO 2006/072047 | 7/2006 | |
| WO | WO-2006072047 A2 * | 7/2006 | ........... H04L 9/3236 |

OTHER PUBLICATIONS

How to calculate the size of encrypted data?, http://www.obviexcom/articles/, 2017, (8 pages).

(Continued)

*Primary Examiner* — Hao Fu
(74) *Attorney, Agent, or Firm* — DLA Piper LLP (US)

(57) ABSTRACT

A method and a system for fingerprinting signatures and enhanced signature capturing for charge card transactions on mobile communication devices identify and transform a signature into a normalized representation such as a bytestream including coordinate data and combine the normalized representation with some transaction information into combined data. The combined data is further transformed into fixed length data stored for further analyses or uses. Upon the receipt of a dispute, the stored representation(s) of the signature and some of the stored transaction information of the transaction in dispute may be transformed into a first fixed length data. The first fixed length data may be further compared with the stored fixed length data obtained at the time of the transaction to resolve the dispute. The representations of signatures of multiple (Continued)

transactions may be used to determine whether these multiple transactions belong to the same category or to different categories.

25 Claims, 14 Drawing Sheets

(51) Int. Cl.
*G06Q 20/34* (2012.01)
*G06K 9/00* (2006.01)
*G06K 9/34* (2006.01)
*G06K 9/22* (2006.01)

(52) U.S. Cl.
CPC ............... *G06K 9/22* (2013.01); *G06K 9/34* (2013.01); *G06Q 20/322* (2013.01); *G06Q 20/34* (2013.01)

(56) References Cited

U.S. PATENT DOCUMENTS

| | | | |
|---|---|---|---|
| 8,577,810 B1 | 11/2013 | Dalit et al. | |
| 8,584,937 B1 | 11/2013 | Kowalchyk et al. | |
| 8,650,543 B1 | 2/2014 | Winch | |
| 2002/0140714 A1 | 10/2002 | Hoffman | |
| 2008/0078830 A1 | 4/2008 | Ramachandran | |
| 2009/0044019 A1* | 2/2009 | Lee | H04L 9/3239 713/176 |
| 2009/0049534 A1* | 2/2009 | Chung | G06Q 10/10 726/7 |
| 2012/0116972 A1 | 5/2012 | Walker | |
| 2013/0137488 A1 | 5/2013 | Rao et al. | |
| 2013/0148024 A1 | 6/2013 | Shin et al. | |

OTHER PUBLICATIONS

What is the Difference between Hashing and Encrypting, https://www.securityinnovationeurope.com/blog/page/whats-the-difference-between-hashing-and-encrypting, 2017, (10 pages).
International Search Report issued in PCT Application No. PCT/US2014/043391 dated Feb. 27, 2015.
Written Opinion issued in PCT Application No. PCT/US2014/043391 dated Feb. 27, 2015.
http://en.wikipedia.org/wiki/B%C3%A9zier_curve, printed Jun. 16, 2014 (13 pages).
http://en.wikipedia.org/wiki/Handwriting_recognition, printed Jun. 16, 2014 (8 pages).
http://en.wikipedia.org/wiki/Compression_artifact, printed Jun. 16, 2014 (7 pages).
http://en.wikipedia.org/wiki/Hash_function, printed Jun. 16, 2014 (14 pages).
http://en.wikipedia.org/wiki/Cryptographic_hash_function, printed Jun. 16, 2014 (11 pages).
Halevi, "Invertible universal Hashing and the TET Encryption Mode", https://www.iacrorg/archive/crypto2007/46220405/46220405.pdf, Jun. 16, 2014 (18 pages).
http://support.intuitglobal.com/gopayment/ca/articles/about-gopayment.jsp, printed Jun. 16, 2014 (2 pages).
http://atozhandwriting.com/signature-analysis/, printed Jun. 16, 2014 (9 pages).
http://en.wikipedia.org/wiki/Chargeback, printed Jun. 16, 2014 (4 pages).
http://payments.intuit.com/mobile-credit-card-processing/, printed Jun. 16, 2014 (10 pages).
https://itunes.apple.com/us/app/intuit-gopayment/id324389392?mt=8, printed Jun. 16, 2014 (3 pages).

* cited by examiner

| Bytestream Representation of Signatures | Transaction Information #1 | Transaction Information #2 | ... |
|---|---|---|---|
| X11,y11,x12,y12,x13,y13,x14,y14,x15,y15,0,0,x21,y21,x22,y22,x23,y23,x24,y24,0,0 | ... | ... | ... |
| ... | ... | ... | ... |
| | | | |
| | | | |
| | | | |
| | | | |
| | | | |

FIG. 7E

METHODS, SYSTEMS, AND ARTICLES OF MANUFACTURE FOR FINGERPRINTING SIGNATURES AND ENHANCED SIGNATURE CAPTURING FOR CHARGE CARD TRANSACTIONS ON MOBILE COMMUNICATION DEVICES

CROSS-REFERENCE TO RELATED APPLICATIONS

This application is a Continuation of U.S. application Ser. No. 14/306,151 filed Jun. 16, 2014, the contents of which is incorporated herein by reference in its entirety.

BACKGROUND

Charge cards such as credit cards, debit cards, etc. have been extensively used in various type online or arm-length transactions for exchanges of proceeds with various products or services. Many users or merchants, including those in brick and mortar stores as well as those on the go, use mobile communication devices (e.g., cell phones, tablets, laptops, etc.) paired with mobile point-of-sale terminals (e.g., credit card terminals) to conduct transactions. These charge card transactions collect signature information of the cardholders at the point-of-sale (POS) as a proof and authorization of transaction on the part of the card holder and as a part of transaction records for future dispute resolution purposes. Modern point-of-sale terminals (e.g., credit card readers on or as a part of a mobile communication device) may include touch-sensitive screen to capture cardholders' signatures entered by, for example, fingers or a writing utensil (e.g., a stylus). The mobile communication device or the point-of-sale terminal (collectively charge card transaction device hereinafter) may then package a captured signature as an image file and store or transmit for storage purposes the image file as a part of the transaction records.

To expedite the charge card payment process to increase the business flow, these charge card transaction devices oftentimes compress the image of a signature with some lossy image compression schemes to reduce the required time for transmitting the signature because the sizes of lossless images may take longer time for transmission and hence hinder the business flow. For example, an image of a signature may be packaged in a TIFF (Tagged Image File Format) container including a compressed image (e.g., a JPEG or Joint Photographic Experts Group image) to reduce the required time to transmit the captured signature image. Such conventional approaches for capturing signatures may nevertheless be subjected to various payment card fraudulent schemes such as forging signatures, duplication or skimming of charge card information, signature forgery, after-the-fact fabrication of signatures (e.g., fabrication of signatures after the transactions are completed), etc.

Therefore, there exists a need for an improved methods and systems for fingerprinting signatures and enhanced signature capturing for charge card transactions on mobile communication devices.

SUMMARY

Disclosed are various embodiments relating to methods, systems, and articles of manufacture for fingerprinting signatures and enhancing signature capturing for charge card transactions on mobile communication devices. The method may identify a charge card transaction and transaction information at a mobile communication device. The transaction information includes at least a signature of a representation of a signature of the cardholder of the charge card used to pay for the transaction. The method may further capture one or more representations for the signature and transform the one or more transformations as well as at least some of the transaction into a data entry by using a transform. In some embodiments, the one or more representations captured for the signature comprise a bytestream of coordinate data along one or more strokes of the signature. The method may further identify the strokes of the signature and the corresponding coordinates of the beginning point of each stroke.

One or more waypoints and their corresponding location data (e.g., coordinates) along each stroke may also be identified in some embodiments. In these embodiments, the method may identify the waypoint data by using a constant or variable temporal interval or a constant or variable spatial interval. In some of these embodiments where a constant or variable temporal interval is used, the mobile communication device identifying or determining a waypoint may further identify a temporal interval, a beginning time point for a beginning point of a stroke of the signature, and identify a waypoint along a stroke of the signature after the temporal interval from the beginning time point. In some of these embodiments where a constant or variable spatial interval is used, the mobile communication device identifying or determining a waypoint may further identify a curvature or linearity of a stroke and identify a waypoint along a stroke of the signature based at least in part upon the identified curvature, the linearity, or a change in the curvature or linearity of the stroke.

In some embodiments, the method may further normalize the signature entered on an electronic visual display or a representation thereof captured by the mobile communication device. In these embodiments, the method may assign a coordinate system that includes an origin for the signature and assign a unit of measurement to at least the horizontal axis or the vertical axis. In addition or in the alternative, the method may further determine a bounding box for the signature or for a signature field in an electronic visual display of the mobile communication device and determine a scaling factor for the bounding box by using the bounding box and a predetermined size or a predetermined dimension. The method may then normalize the signature or a representation thereof by applying the scaling factor to the one or more representations of the signature. In some embodiments, the method may input the one or more identified representations of the signature and at least some of the transaction information into a hash function and generate a fixed length data entry as the data entry.

Some embodiments are directed at a method for using stored transaction information, one or more representations of a signature of a cardholder, and the data entry that is determined by transforming the one or more representations and at least some of the transaction information. In these embodiments, the method may transmit the one or more representations of a signature, the at least some of the transaction information, and the data entry to a remote computing system. The remote computing system may then store the one or more representations of the signature, the at least some of the transaction information, and the data entry in a data structure in a non-transitory machine readable medium for the corresponding charge card transaction.

In some of these embodiments, the method may identify a request for dispute resolution for the charge card transaction filed by a buyer, identify the one or more representations of the signature and the at least some of the transaction information for the charge card transaction stored in data structure in the non-transitory machine readable medium, and identify the data entry stored in the non-transitory machine readable medium for the charge card transaction. The method may further generating a first data entry by transforming the one or more representations of the signature and the at least some of the transaction information by using the transform, compare the first data entry with the data entry stored in the non-transitory machine readable medium, and respond to or resolve the request for dispute resolution based at least in part upon comparison results. In these embodiments, the transform is also used to transform the one or more representations and at least some of the transaction information into the data entry.

Some embodiments are directed at classifying multiple transactions by using the stored representations of signatures for these multiple transactions. In these embodiments, the method may transmit the one or more representations of the signature, the at least some of the transaction information, and the data entry to a remote computing system and determine whether a first charge card transaction and the charge card transaction are to be classified into a same category or a different category. In some of these embodiments, the method that determines whether a first charge card transaction and the charge card transaction are to be classified into a same category or a different category may further identify one or more first representations of a first signature for the first charge card transaction, examine the one or more first representations of the first signature and the one or more representations of the signature, and determine whether the one or more first representations of the first signature exactly or approximately match the one or more representations of the signature.

In addition or in the alternative, the method may identify one or more first representations of a first signature for the first charge card transaction, optionally reconstruct the first signature by using at least the one or more first representations of the first signature for the first charge card transaction, optionally reconstruct the signature by using at least the one or more representations of the signature for the charge card transaction, examine the first signature and the signature, and determine whether the first signature exactly or approximately matches the signature. Moreover, the method may identify one or more first representations of a first signature for the first charge card transaction, identify or determine a first expression for the one or more first representations of the first signature for the first charge card transaction, identify or determine an expression for the one or more representations of the signature for the charge card transaction, and determine whether the first expression exactly or approximately matches the expression in some embodiments. In these embodiments, the first expression includes a first mathematical expression, and the expression includes a mathematical expression.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE DRAWINGS

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 7E illustrates a simplified data structure including some entries of information or data of transactions in some embodiments.

Figure 1:
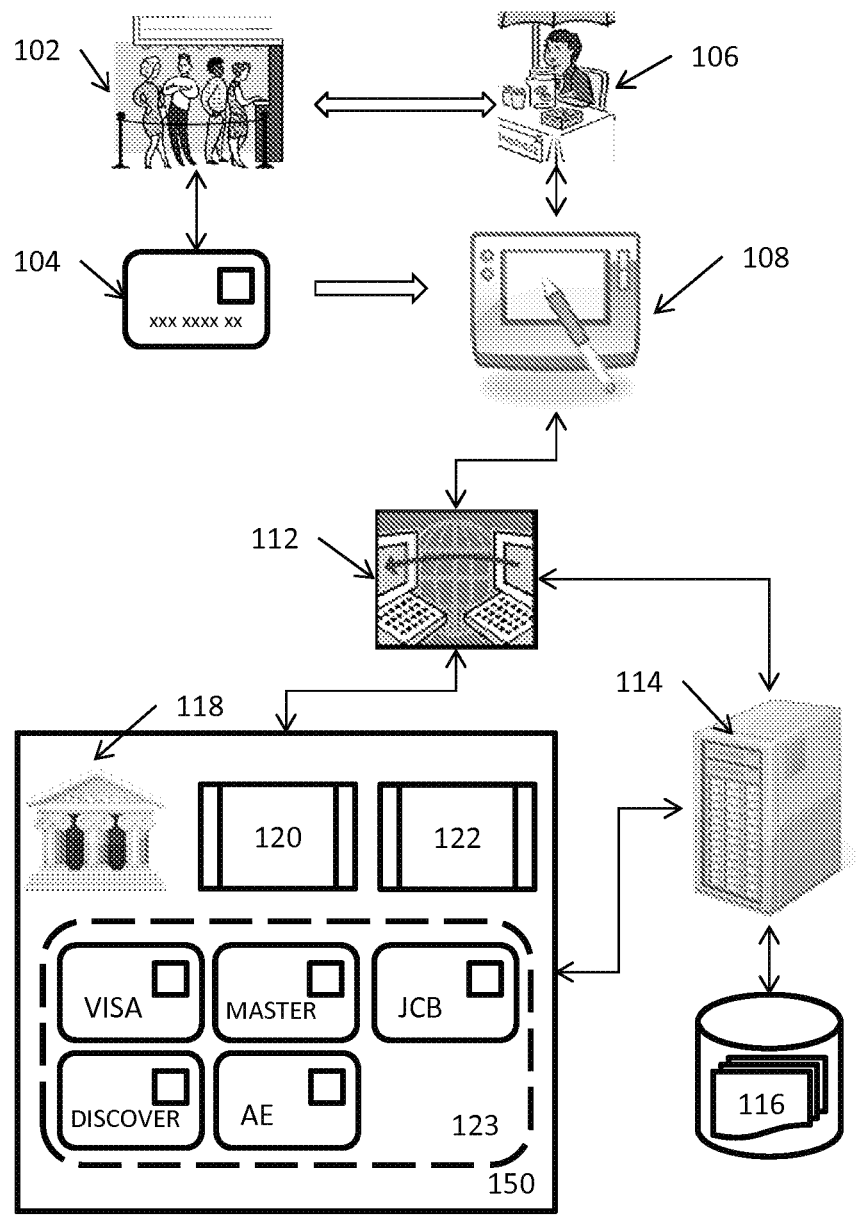
FIG. 1 illustrates a high level flow diagram of a method or system for fingerprinting signatures and enhanced signature capturing for charge card transactions on mobile communication devices in some embodiments.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

Disclosed is a method, system, and computer program product for fingerprinting signatures and enhanced signature capturing for charge card transactions on mobile communication devices in various embodiments. The method or system may identify a signature entered into, for example, a touchscreen of a mobile communication device and then transform the identified signature into a normalized representation. The normalized representation of the signature may comprise a bytestream having coordinate data of various captured points in the signature. The method or system may then fingerprint the signature by combining the normalized representation of the signature with some transaction information to form combined data. The combined data may be further transformed into a fixed length data entry that is stored for further analyses or uses. For example, the method or system may apply a hash function to the combined data to generate a hash function output or a hash value for the combined data at or near the time of the charge card transaction.

The normalized representation and the transaction information used to generate the fixed length data entry may be stored together with the fixed length data entry on the mobile communication device, on a remote computing system, or on both. Upon receipt of a dispute for a transaction, the method or system may retrieve the stored normalized representation of the signature and some of the stored transaction information of the transaction in dispute. The method or system may perform an additional transform on the stored normalized representation of the signature and some of the stored transaction information to generate another fixed length data. This another fixed length data entry may then be compared with the stored fixed length data entry. If the two data entries match, the method or system may then determine that there was a signature captured at the time of the transaction, and the stored data entry is the same as the new data entry generated from the transaction information and the normalized representation of the signature. In other words, the method or system may verify that the records for the transaction in dispute are consistent and may respond to the dispute accordingly.

Moreover, the representations of signatures of multiple transactions may be also used to determine whether these multiple transactions belong to the same category or to different categories. For example, the method or system may compare the normalized representation of a signature or another expression therefor of a transaction in question with the corresponding data of a known, valid transaction to determine whether the transaction in question also constitutes a known, valid transaction. Similarly, the method or system may compare the normalized representation of a signature or another expression therefor of a transaction in question with the corresponding data of a known, fraudulent transaction to determine whether the transaction in question also constitutes a known, fraudulent transaction.

FIG. 1 illustrates a high level flow diagram of a method or system for fingerprinting signatures and enhanced signature capturing for charge card transactions on mobile communication devices in some embodiments. A mobile communication device includes a portable device having an electronic visual display (e.g., a touchscreen) for displaying information and also for accepting signatures of cardholders of charge cards. A mobile communication device may also include the capability of reading charge card information from charge card either as a native functionality of the device itself or as an add-on function when operating in conjunction with another peripheral device communicatively coupled to the mobile communication device.

In some embodiments, a mobile communication device comprises a mobile computer (e.g., a laptop computer), a mobile Internet device (MID), a personal digital assistant (PDA), an enterprise digital assistant (EDA), a portable media player capable of telecommunication purposes (e.g., an media player with wireless communication capabilities), a portable entertainment device with telecommunication purposes (e.g., a portable gaming device with wireless communication capabilities), a mobile phone, a portable navigation device with telecommunication capabilities, a combination of any of the aforementioned devices, or any devices with telecommunication capability as well as the aforementioned capability of reading charge card information and accepting cardholders signatures.

In these embodiments illustrated in FIG. 1, a buyer 102 carrying a charge card 104 (e.g., a credit card) and a seller (e.g., a merchant or a store clerk) 106 may wish to enter a transaction where the buyer 102 wishes to purchase some products or services from the seller 106 by using the charge card 104. The seller 106 in this illustrated example may or may not necessarily have a brick-and-mortar store and may utilize a mobile payment 108 (e.g., a cellular phone, a tablet, etc.) to complete transactions with buyers. In these embodiments, the mobile communication device 108 is wirelessly connected to a backend server 114 to enable transfer or exchange of information or data therebetween through a network 114 (e.g., a cellular network or the Internet). The backend server may include therewithin or may be operatively and remotely coupled to some storage device 116 to read data or information from or to write data or information to the storage device.

The mobile communication device 108 of the seller 106 may be operatively connected to the backend server 114 in such a way that the backend server 114 may recognize that the connected mobile communication device 108 is associated with a particular seller 106 and may further update its database(s) on the coupled storage device 116 with data or information regarding various transactions involving the seller 106 or the buyer 102. For example, the backend server 114 may update the user or the merchant account associated with a particular seller 106. During a transaction with the buyer 102, the seller 106 may use the mobile communication device 108 to process payment from the buyer 102 by, for example, reading information from the charge card 104. The mobile communication device 108 may read the charge card information, identify information about the item(s) involved in the transaction, capture the signature of the buyer 102, and perform various functions as described below with reference to FIGS. 2-7A-D. The mobile communication device 108 may store various transaction information, one or more representations of a signature, and a transformed data entry for the one or more representations of the signature either in one or more data structures of the mobile communication device 108, in one or more data structures on or operatively coupled to the backend server 114, or in both.

The mobile communication device 108 may identify information from the charge card by, for example, swiping the magnetic strip (if any) on the charge card, interacting with the chip embedded (if any) on the charge card 104, scanning or photographing certain code(s) or portion(s) of the charge card 104, etc. and subsequently transmit the identified information through the network 112 to various payment institutions 150 including an acquiring bank or a card issuing bank 108, a payment gateway 120, a payment processor 122 associated with the acquiring bank 108, the card association 123 (e.g., VISA®, Master®, JCB®, Discover®, American Express®, etc.)

These payment institutions in turn authenticate the charge card, process the payment information and request, and make settlement such that the transaction is fulfilled between the seller 106 and the buyer 102. It shall be noted that the backend server 114 may, either by itself or in conjunction with one or more other servers, either interface with the payment institutions 150 or become a part of the payment institutions 150 to facilitate the exchange or transmission of information or data to complete transactions. For example, the backend server 114 may assume the role to become the roles of the payment gateway 120, the acquiring bank 108, or the payment processor 122 for the acquiring bank 108 in some embodiments.

Figure 2:
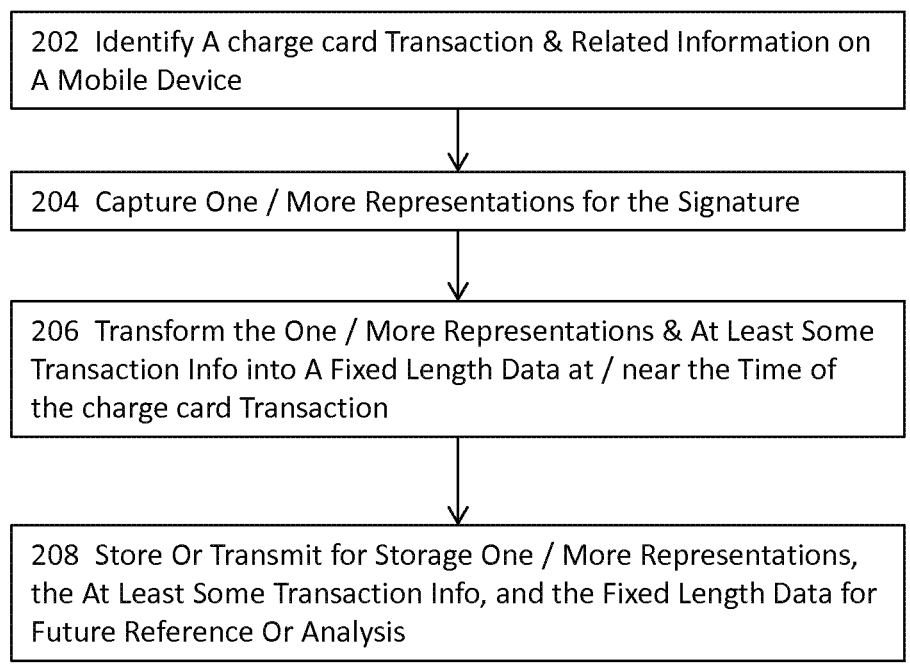
FIG. 2 illustrates a high level flow diagram of a method or system for fingerprinting signatures and enhanced signature capturing for charge card transactions on mobile communication devices in some embodiments.

FIG. 2 illustrates a high level flow diagram of a method or system for fingerprinting signatures and enhanced signature capturing for charge card transactions on mobile communication devices in some embodiments. In these embodiments illustrated in FIG. 2, the method or system may identify a charge card transaction and information related to the transaction and/or the charge card on a mobile communication device at 202. For example, the mobile communication device may a built-in or externally attached charge card reader to read the charge card information for a transaction between a seller and a buyer. The related information may include, for example, transaction data and the signature of the cardholder entered on an electronic visual display (e.g., a touchscreen of the mobile communication device). The transaction data may include temporal information such as date and time about the transaction, information (e.g., description, quantity per item, amount per item, etc.) about the product or service item(s) purchased in the transaction, information about the seller, charge card information (e.g., masked charge card number), monetary information (e.g., the sub-total, sales tax, tip, etc.) of the transaction, transaction identifier (e.g., an Electronic Data Capture or EDC transaction ID), or any other suitable information.

At 204, the method or system may capture one or more representations of the signature of the card holder to complete the transaction. The cardholder may enter his or her signature on an electronic visual display (e.g., a touchscreen) of the mobile communication device of the seller by hand or with a writing utensil (e.g., a stylus). The method or system may then capture one or more representations of the signature in a variety of different manners. In some, the method or system may capture the signature in the form of one or more streams of digital data instead of an image of the signature in conventional approaches. A stream of digital data may include a bytestream, a sequence of bytes, or a sequence of octets (hereinafter bytestream) converted or transformed from the signature. In some of these illustrated embodiments, the method or system may capture the beginning point of the signature or the beginning point of each stroke of the signature and receive the entire signature entered on the electronic visual display by the cardholder.

In these embodiments, the method or system may then determine multiple waypoints for the signature or for each stroke of the signature. A waypoint may be determined by, for example, analyzing the curvature or rate of change of the signature or each stroke of the signature and capturing a waypoint at the appropriate location to generate a segment that approximates a stroke or a part of a stroke of the signature. For example, the method or system may use one or more forms of a Bezier curve (e.g., linear, quadratic, cubic, or even higher-order Bezier curve) and capture waypoints at various locations around which curvature changes in the signature or stroke to closely approximate a signature or a stroke captured on an electronic visual display of a mobile communication device. In some other embodiments, the method or system may insert waypoints at fixed spatial intervals (e.g., one way points for every fixed number of pixels).

In some other embodiments, the method or system may capture the one or more representations of the signature in nearly real-time when the signature is being entered. For example, upon the display of the signature screen and before the completion of the signature (e.g., receiving the click on an "Accept" button to indicate the cardholder's acceptance of the signature), the method or system may record the beginning point of each stroke of the signature while no input on the electronic visual display indicates the end of a stroke or signature. The method or system may then capture the locations of the cardholder's finger or writing stylus at a fixed or variable temporal interval (e.g., one captured location on screen every 20 milliseconds). Yet in some other embodiments, the method or system may use a combined technique to capture one or more representations of the signature by using a constant or variable temporal interval capturing scheme and a constant or variable spatial interval (e.g., distance between two neighboring waypoints).

For the ease of description and explanation, the signature capturing scheme employing a constant or variable temporal interval may be referred to as a temporal signature capture scheme, and the signature capturing scheme employing a constant or variable spatial interval may be referred to as a spatial signature capture scheme. The waypoints or locations may be captured in a form of the absolute coordinates with respect to a universal origin (e.g., the lower left corner of the display area or the signature field) or relative coordinates with respect to a custom defined origin (e.g., a center of the waypoints or locations in the electronic visual display of the mobile communication device. In some embodiments, each stroke may be captured as a single stream of digital data (e.g., a bytestream), and a signature may thus include a plurality of bytestreams that collectively represent the signature. In some other embodiments, a signature including one or more strokes may be captured as a single stream of digital data (e.g., a single bytestream).

At 206, the method or the system may transform the one or more representations and at least some of the transaction information into a fixed length data at or near the time of the charge card transaction. Mobile communication devices may have different screen sizes and resolution, and different signatures may have different numbers of strokes. Therefore, the captured one or more representations may have different "waypoints" regardless of whether a spatial signature capturing scheme or a temporal signature capturing scheme is used. For example, a tablet computer typically has a larger electronic display and thus may accommodate a larger signature field. Electronic display having higher display resolution may capture finer details of a signature and thus produce a larger amount of data when used to capture signatures.

More complex signatures may also produce larger amount of data. On the other hand, the same charge card may nevertheless be used on various such mobile communication devices that produce the representations of the same cardholder's signature with different sizes or amount of data (e.g., different number of bytes in the captured bytestreams). Such variations in the representations of the signature may present difficulties in future analyses of the signatures or in storage. For example, the first bytestream of the signature captured on a first mobile communication device may contain only 16 bytes of data, but the second bytestream of the same signature captured on a second mobile communication device may nevertheless contain 24 bytes of data.

The discrepancy between the two representations of the same signature may cause inefficiency in the storage solution by requiring a field of at least 24 bytes to store 16 bytes of data. Therefore, the method or system may transform the captured one or more representations of a signature into a fixed length data by using a first transform. In some embodiments, the method or system may use a hash function to hash the one or more representations of a signature or the one or more representations of a signature combined with other information (e.g., some transaction information) into a hash value of a fixed length. The transform may include a non-colliding hash function or any other hash function that transforms the same input into the same hash value in some embodiments. The transform may have a nearly negligible probability (e.g., one in several billions) of transforming two different input values into the same output.

The transform may be non-invertible for security purposes in some embodiments, and may be invertible in some other embodiments. In the latter embodiments where the transform is invertible, the output of the transform may be transformed back to the input by using, for example, the inverse transform. For example, the method or system may transform the one or more representations of a signature into a first bytestream by using a transform and use the inverse of the transform to transform the first bytestream back into the original first bytestream. At 208, the method or system may transmit, for storage purposes, the one or more representations of the signature, at least some of the transaction information, and the fixed length data in a non-transitory computer accessible storage medium on a remote computing system (e.g., the remote server 114 of FIG. 1) in some embodiments. In some other embodiments, the one or more representations of the signature, at least some of the transaction information, and the fixed length data may be stored in a non-transitory computer accessible storage medium on the mobile communication device. Yet in some other embodiments, the one or more representations of the signature, at least some of the transaction information, and the fixed length data may be stored in both a non-transitory computer accessible storage medium on the mobile communication device and a non-transitory computer accessible storage medium on a remote computing system.

Figure 3:
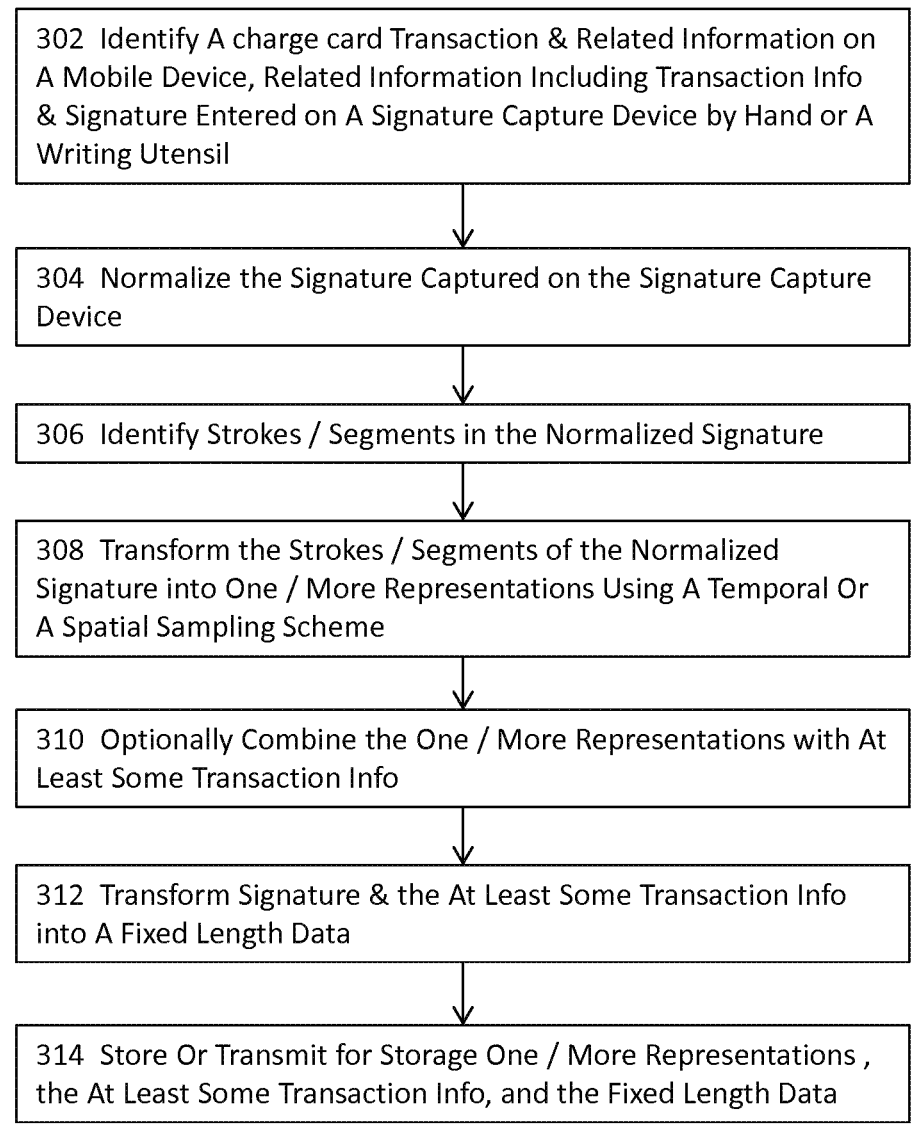
FIG. 3 illustrates a more detailed flow diagram for a method or system for fingerprinting signatures and enhanced signature capturing for charge card transactions on mobile communication devices in some embodiments.

FIG. 3 illustrates a more detailed flow diagram for a method or system for fingerprinting signatures and enhanced signature capturing for charge card transactions on mobile communication devices in some embodiments. In these embodiments illustrated in FIG. 3, the method or system may first identify a charge card transaction and information related to the transaction on a mobile communication device in substantially similar manners as those described for 202 of FIG. 2. At 304, the method or system may normalize the signature captured on a signature capturing device such as an electronic visual display of the mobile communication device. As presented above in FIG. 2, mobile communication devices may have different screen sizes and resolution capabilities, and different signatures may have different numbers of strokes. Therefore, captured signatures may have different "waypoints" regardless of whether a spatial signature capturing scheme or a temporal signature capturing scheme is used.

In normalizing captured signatures, the method or system may, for example, assign a coordinate system including an origin for the signature entered on the mobile communication device or for the signature field before, during, or after the signature is entered. The method or system may choose an absolute coordinate system having a universally existing origin (e.g., the lower left corner or the center of the signature field or the electronic visual display). The method or system may use a pixel width as a unit of measure in both the horizontal and vertical direction or may use the same unit of measure across different mobile communication devices (e.g., the lower left hand corner of the signature field or electronic visual display being the origin (0, 0), and the upper right hand corner of the signature field or electronic visual display having the coordinates (4, 1) regardless of the resolution or size of the actual signature field or the electronic visual display.

In some embodiments, the method or system may identify a bounding box that constitutes the smallest polygon containing the signature and normalize the size of the bounding box by scaling the bounding box to a bounding box having a predetermined, universal size (e.g., predetermined width, predetermined length, or both) across different platforms. The method or system may then capture the coordinates of the beginning point and waypoints of each stroke relative to the normalized bounding box in some embodiments. In some other embodiments, the method or system may have pre-captured one or more representations of the signature. In these embodiments, the method or system may then transform the captured one or more representations of the signature according to the normalization of the bounding box.

For example, the bounding box may be normalized by using a geometric transform to a normalized bounding box having predetermined dimension(s). The method or system may then use the same geometric transform to transform the captured one or more representations (e.g., the coordinates of the beginning point(s) and/or the waypoint(s)). In some embodiments where an image is captured for 304, the method or system may normalize the captured signature image by using similar techniques described above. For example, the method or system may determine the bounding box for the signature image and normalize the signature by applying a geometric transform to the captured image such that the bounding box may be transformed to a universal bounding box having predetermined dimension(s). In some other embodiments where the signature has been captured as one or more representations such as one or more streams of digital data (e.g., coordinates), the method or system may also apply substantially similar techniques as described above to normalize the captured one or more representations of the signature.

At 306, the method or system may identify one or more strokes or segments in the normalized signature. For example, the method or system may first identify the beginning of the signature capturing session as the presentation of the signature screen to a cardholder and the end of the signature capturing session upon receiving a cardholder's input (e.g., clicking on "Accept" button). The method or system may identify the beginning of a stroke when there is no input received from the cardholder on the electronic visual display (e.g., lifting the signing finger or stylus). By identifying beginnings of strokes, the method or system may hence identify strokes for the signature. At 308, the identified strokes or segments of the strokes may be transformed into or captured as one or more representations (e.g., one or more streams of data) by capturing, for example, the absolute or relative coordinates of the beginning points and waypoints as described above for FIG. 2.

The method or system may optionally combine the one or more representations with at least some of the transaction information in a variety of different manners at 310. At 312, the method or system may then transform the one or more representations of the signature or the one or more representations of the signature combined with at least some of the transaction information into a fixed length data entry in substantially similar manners as those described for 206 of FIG. 6. At 314, the method or system may store or transmit for storage purposes the one or more representations, the at least some of the transaction information, and the fixed length data entry in one or more non-transitory computer accessible or machine accessible media on the mobile communication device, a remote computing system, or both.

Figure 4A:
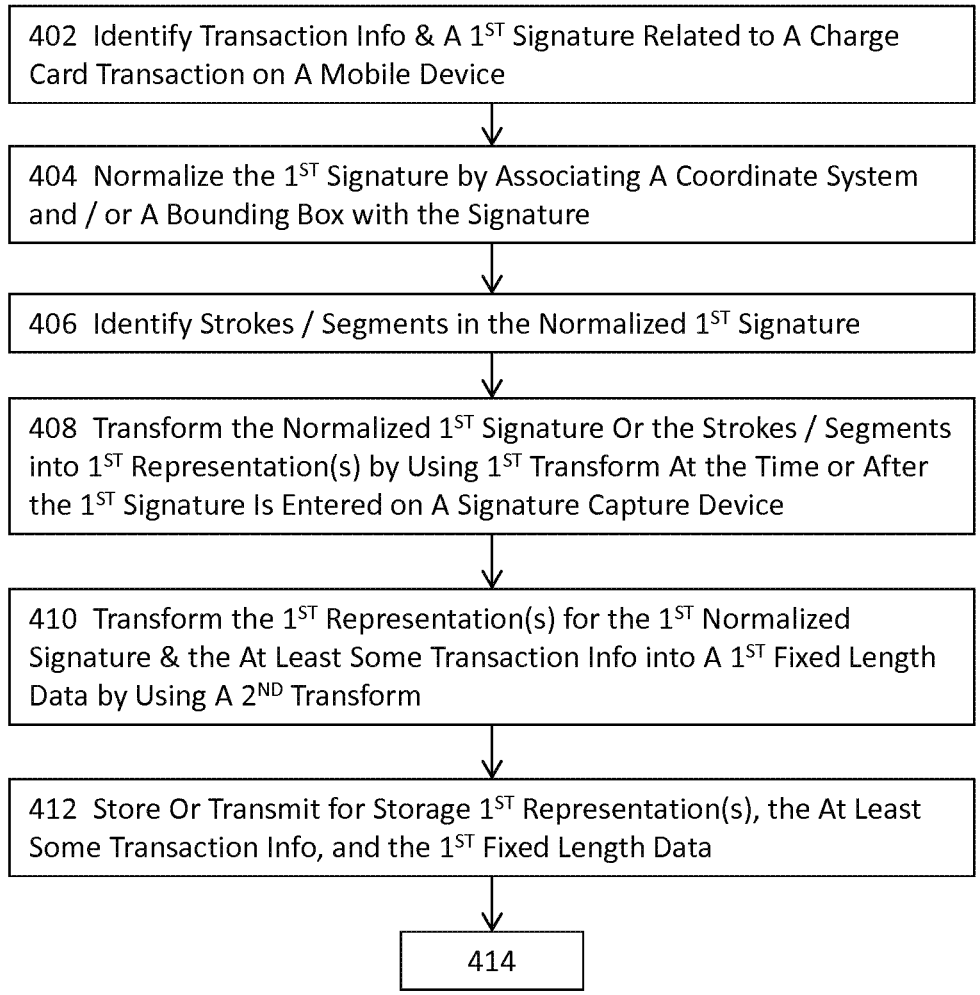
FIGS. 4A-C illustrate a more detailed flow diagram of a method or system for fingerprinting signatures and enhanced signature capturing for charge card transactions on mobile communication devices and the use of captured signatures for further analyses in some embodiments.
Figure 4B:
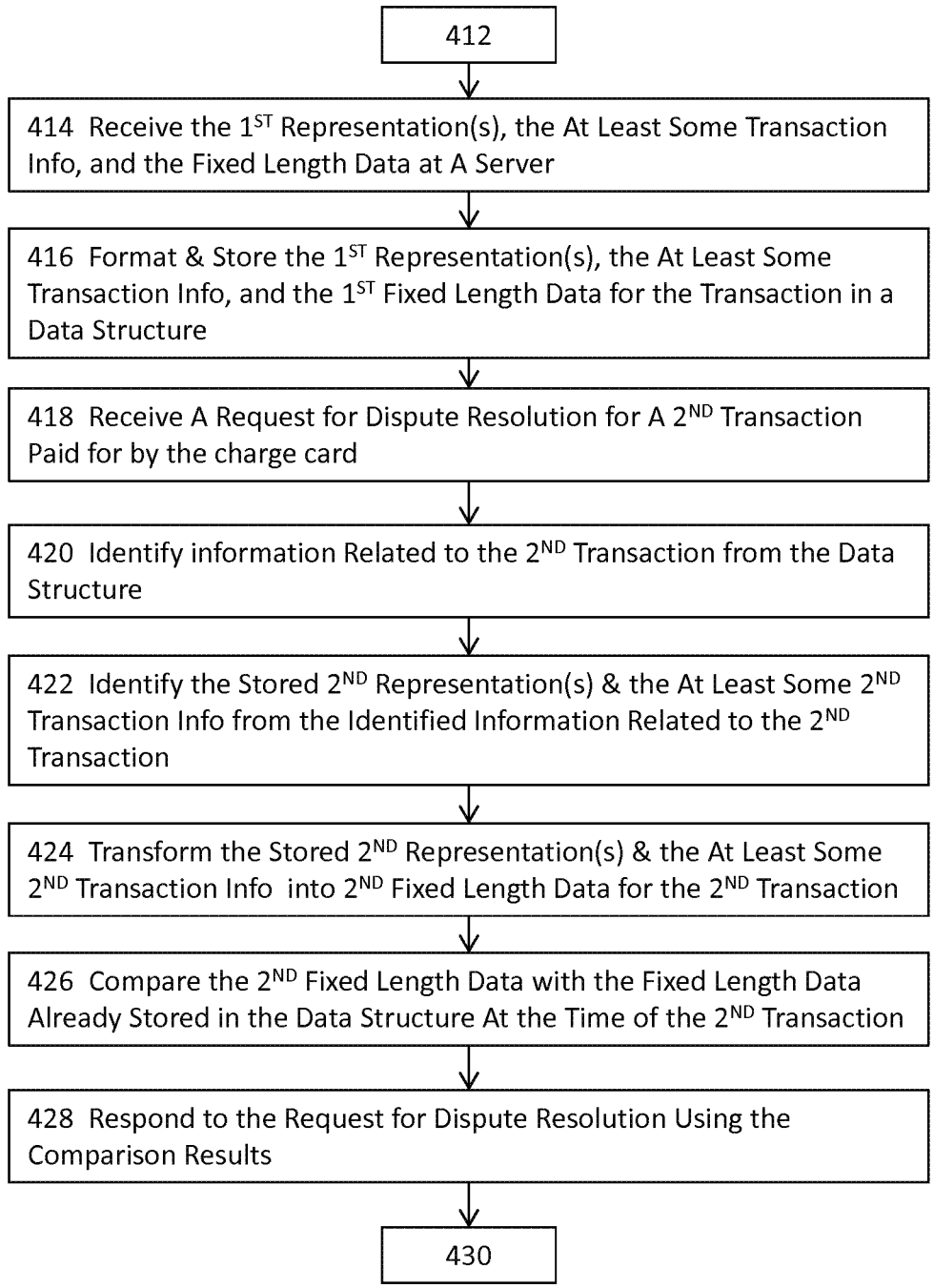
Figure 4C:
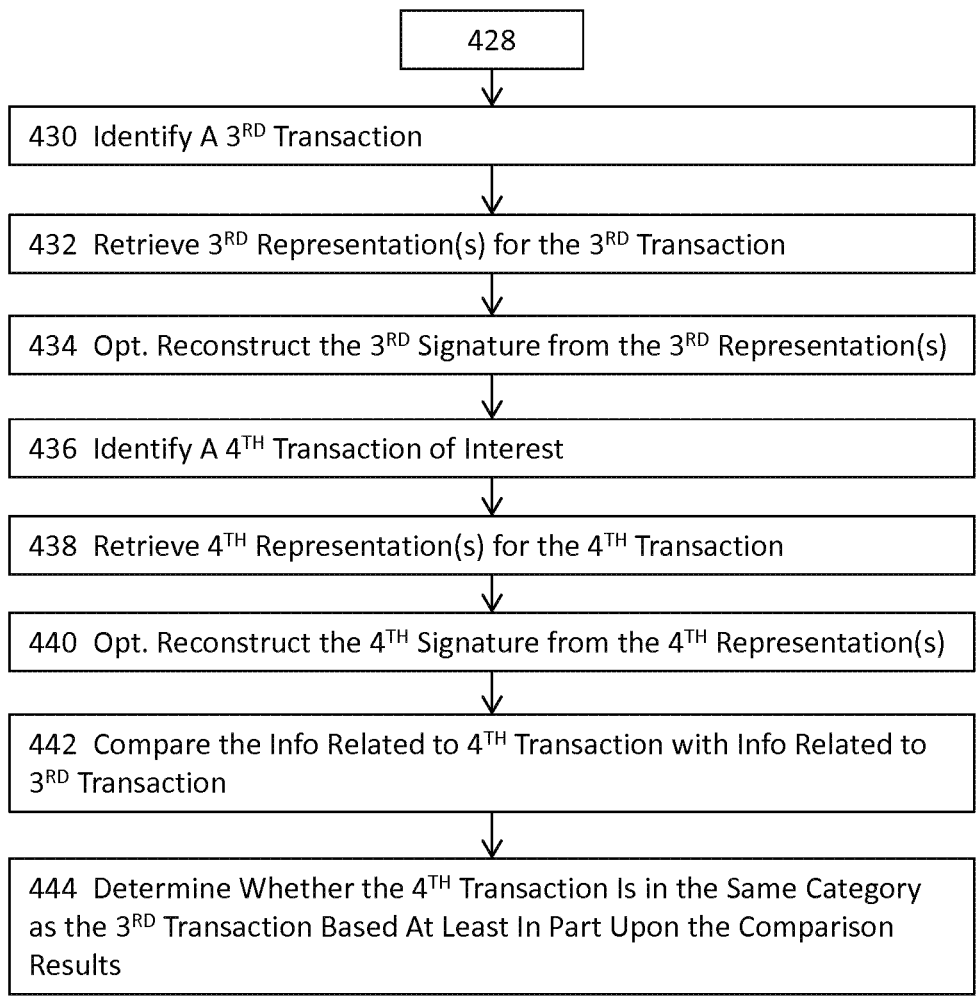

FIGS. 4A-C illustrate a more detailed flow diagram of a method or system for fingerprinting signatures and enhanced signature capturing for charge card transactions on mobile communication devices and the use of captured signatures for further analyses in some embodiments. In these embodiments illustrated in FIGS. 4A-C, the method or system may identify transaction information and a first signature related to a charge card transaction on a mobile communication device at 402 in substantially similar manners as those described for 302 of FIG. 3 or 202 of FIG. 2. The first signature or one or more representations thereof may then be normalized at 404 by using substantially similar techniques described above with reference to FIG. 3 or FIG. 2 in some embodiments.

For example, the method or system may assign a coordinate system or determine a bounding box to normalize the captured signature or the one or more representations of the signature (e.g., a computer image of the signature or a bytestream of the signature). Normalization may accommodate variations in, for example, sizes or resolution of electronic visual display and/or complexities of signatures. In some embodiments where the final representation of the first signature is further transformed into a fixed length data entry (e.g., by using a hash function), the normalization at 404 may be optional because the transformation may also accommodate such variations in, for example, sizes or resolution of electronic visual display and/or complexities of signatures. The method or system may identify the strokes or segments of one or more strokes of the first signature at 406 by using substantially similar techniques as those described for 306 of FIG. 3.

At 408, the captured first signature, the strokes or segments of strokes of the first signature, or a normalized representation thereof may be transformed into a first representation for the first signature. In some embodiments, the first representation for the first signature may include a bytestream for the first signature or a bytestream for each stroke of the first signature. The one or more bytestreams may include the absolute or relative coordinates of the beginning points and various waypoints of the first signature or each stroke of the first signature. At 410, the first representation obtained at 408 may be further transformed into a first fixed length data entry by using a second transform in some embodiments. In some of these embodiments, the second transform may include a hash function.

For example, the second transform may include a non-colliding hash function or any other hash function that transforms the same input into the same hash value in some embodiments. The second transform may have a nearly negligible probability (e.g., one in several billions) of transforming two different input values into the same output. The second transform may be non-invertible for security purposes in some embodiments, and may be non-invertible in some other embodiments. In the latter embodiments where the second transform is invertible, the output of the transform may be transformed back to the input by using, for example, the inverse transform of the second transform. At 412, the method or system may transmit, for storage purposes, the first representation of the first signature, at least some of the transaction information, and the first fixed length data in one or more non-transitory computer accessible storage media on the mobile communication device, a remote computing system (e.g., the remote server 114 of FIG. 1), or both in some embodiments.

FIG. 4B illustrates a flow diagram of a method or system for using the stored transaction information, representations of signatures, and the transformed fixed length data entries of the representations or of the representations combined with at least some transaction information for resolving disputed transactions in some embodiments. In some of these embodiments illustrated in FIG. 4B, the method or system may receive, at 414 from a mobile communication device, the first representation of a signature for a transaction, at least some of the stored transaction information, and the corresponding fixed length data entry at a remote computing system such as a server 114 in FIG. 1. The method or system may store at 416 the first representation of a signature of a cardholder of a charge card for a transaction, at least some of the stored transaction information, and the corresponding fixed length data entry in one or more data structures, one or more tables, one or more lists, one or more database tables, or any combinations thereof (collectively "data structure" hereinafter) on the remote computing system.

In some of these embodiments, the method or system may optionally format at least some of the aforementioned information or data to be received for storage purposes. The method or system may receive a request for dispute resolution from, for example, a cardholder for a second transaction that was paid for by the charge card at 418. For example, the cardholder may call or log an electronic request for dispute resolution for a second transaction that was purportedly paid for by the charge card of the cardholder. The call or the electronic request may be arranged and forwarded to a computing system for further processing of the request for dispute resolution. At 420, the method or system may identify information that is related to the second transaction from the data structure upon which information about the second transaction is stored. In some embodiments, the method may identify the one or more second representations of the signature for the second transaction, at least some of the stored second transaction information for the second transaction at 422 from the information identified at 420 for further processing the request for dispute resolution.

At 424, the method may transform the stored one or more second representations of the second signature and the at least some of the second transaction information into the second fixed length data entry by using the same second transform that is used at 410. At 426, the method or system may then compare the second fixed length data entry with the fixed length data entry that was transformed at or shortly after the completion of the second transaction and was already stored in the data structure. The method or system may then respond to the request for dispute resolution by using the comparison results at 428. For example, the method or system may compare the two fixed length data entries at 426 and determine that the two fixed length data entries match each other.

The method or system may thus determine that the stored at least some transaction information and the stored second representations of the signature have not been mutilated since the time of completion of the transaction, and that the second transaction was a valid transaction with the required signature. The method or system may thus generate a response indicating that the stored information related to the second transaction remains unmutilated, and that the second transaction was authorized as evidenced by the unaltered signature based at least in part upon the comparison results. On the other hand, if the method or system, after comparison, finds that the re-determined fixed length data entry does not match the already stored fixed length data entry of the second transaction, the method or system may then determine that the second transaction was not properly authorized and issue a chargeback to the cardholder.

In some embodiments, the method or system may further compare, at 426, the signature, the one or more representations of the signature, or one or more other representations of the signature of a transaction in dispute with a known signature, known one or more representations of the known signature, or known one or more other representations of the know signature to determine whether or not the transaction in dispute is properly authorized by the cardholder of the charge card. For example, the method or system may determine whether the image of the signature of the transaction in dispute exactly or approximately matches a known, valid signature of the cardholder to determine whether the transaction in dispute was properly authorized by the cardholder. As another example, the method or system may compare the bytestream of a known, valid signature of the cardholder with the corresponding bytestream of the transaction in dispute to determine whether or not the signature of the transaction in dispute exactly or approximately matches the known, valid signature of the cardholder.

In some of these embodiments, the method or system reconstruct the signature of the transaction in dispute as well as the known, valid signature of the cardholder by using the stored coordinate information in the respective bytestream and determine whether the two reconstructed signatures are sufficiently close to each other (e.g., within a certain predetermined range or percentage). For example, the method or system may retrieve the same set of points (e.g., beginning point(s) and/or waypoint(s)) from both images and compute the distances (e.g., Euclidean distances) between these points in each set. If the computed distances are identical or sufficiently close, the method or system may determine that these two signatures are identical. As yet another example, the method or system may represent each representation of signature as a mathematical expression (e.g., a linear, quadratic, cubic or higher-order Bezier curve, an n-th order polynomial, etc.)

The method or system may then mathematically determine whether these two mathematical expressions of the two signatures (the signature for the transaction in dispute and the known, valid signature) are identical or sufficiently similar (e.g., same order of polynomials having sufficiently similar coefficients or different orders of polynomials representing similar curves in space, etc.) It shall be noted that other methods or techniques may also be used to determine whether the two signatures or the two representations of the signatures are identical or sufficiently similar, and that the aforementioned techniques are not intended to and thus shall not be construed as limit the scope of other embodiments or the scope of the claims, unless otherwise explicitly recited or claimed.

FIG. 4C illustrates a flow diagram of a method or system for classifying two transactions in a single category in some embodiments. In some embodiments illustrated in FIG. 4C, the method or system may identify a third transaction at 430. The third transaction may include a known, valid transaction in some embodiments where the cardholder properly authorized the third transaction by placing a genuine signature of the cardholder to complete the third transaction. The third transaction may comprise a known, fraudulent transaction in some other embodiments where it has been determined that the signature associated with the third transaction is known to be forged by a fraudster. At 432, the method or system may retrieve the one or more third representations and/or the stored third transaction information for the third transaction.

The method or system may optionally reconstruct the third signature by using the stored one or more third representations and/or the stored third transaction information at 434 in substantially similar manners as described immediately above with reference to FIG. 4B. At 436, the method or system may identify a fourth transaction of interest for classification. The method or system may similarly retrieve the one or more fourth representations for the fourth signature and/or the stored fourth transaction information for the fourth transaction at 438 and optionally reconstruct the fourth signature at 440 by using the one or more fourth representations and/or the stored fourth transaction information. The method or system may then compare the information related to the fourth transaction with the corresponding information related to the third transaction at 442.

The information related to a transaction may include, for example, the one or more representations of the signature for the transaction, the reconstructed signature (if available), the fixed length data entry obtained by transforming the one or more representations or by transforming the one or more representations combined with at least some of the stored transaction information for the transaction in some embodiments. At 444, the method or system may then determine whether the fourth transaction is to be classified as to belong to the same category (e.g., known valid transaction or fraudulent transaction) based at least in part upon the comparison results obtained at 442. For example, the method or system may compare the fourth signature (or one or more representations thereof) with the third signature (or one or more third representations thereof) at 422 to determine whether the fourth signature (or one or more representations thereof) exactly or approximately matches the third signature (or one or more third representations thereof). If the determination result is affirmative, the method or system may thus classify the fourth transaction into the same class or category as the third transaction. Otherwise, the method or system may classify the fourth transaction into a different class or category.

Figure 5:
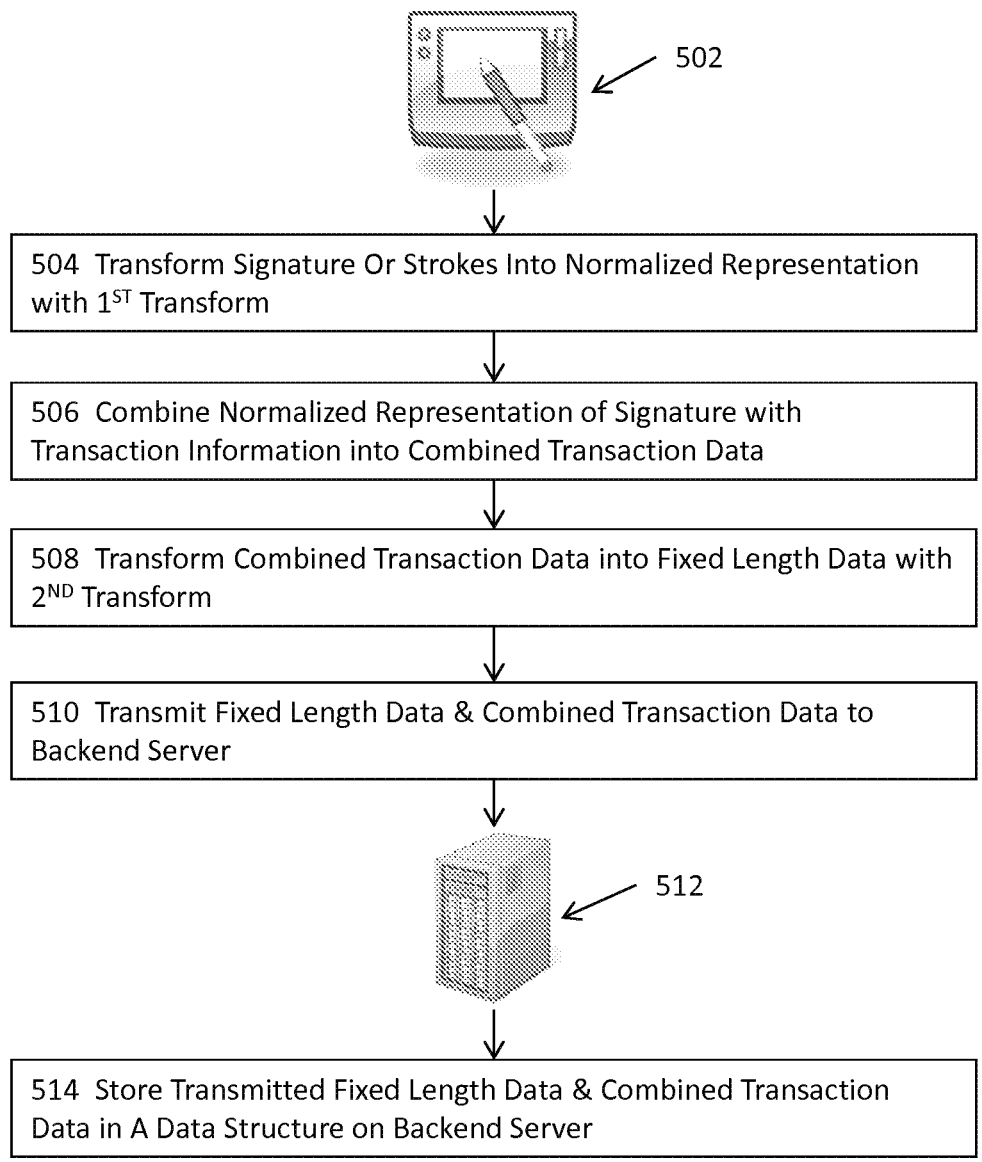
FIG. 5 illustrates a flow diagram of a method or system for fingerprinting signatures and enhanced signature capturing for charge card transactions on mobile communication devices and storing captured signatures on a remote computing system in some embodiments.

FIG. 5 illustrates a flow diagram of a method or system for fingerprinting signatures and enhanced signature capturing for charge card transactions on mobile communication devices and storing captured signatures on a remote computing system in some embodiments. In these embodiments illustrated in FIG. 5, the mobile communication device 502 may receive or identify, for example, the cardholder signature and transaction information about a transaction between the seller and the cardholder of a charge card used to pay for the transaction. The described method or system may capture or transform the signature or strokes thereof into one or more normalized representations by using a first transform at 504.

For example, the method or system may capture or transform the cardholder's signature into a normalized bytestream as previously described. At 506, the method or system may optionally combine the normalized one or more representations of the cardholder's signature with at least some transaction information (e.g., transaction date, transaction time, transaction identification, etc.) to form combined transaction data. The method or system may then transform the combined transaction data into a fixed length data entry by using a second transform at 508. For example, the method or system may use a hash function to hash the combined transaction data into a fixed length data entry at 508. At 510, the fixed length data entry and at least a part of the transaction information (e.g., combined transaction data) to a remote computing system 512 (e.g., the backend server 114 in FIG. 1). The remote computing system 512 may then store the transmitted fixed length data entry and the at least a part of the transaction information (e.g., the combined transaction data obtained at 506) in one or more data structures on the remote computing system at 514.

Figure 6:
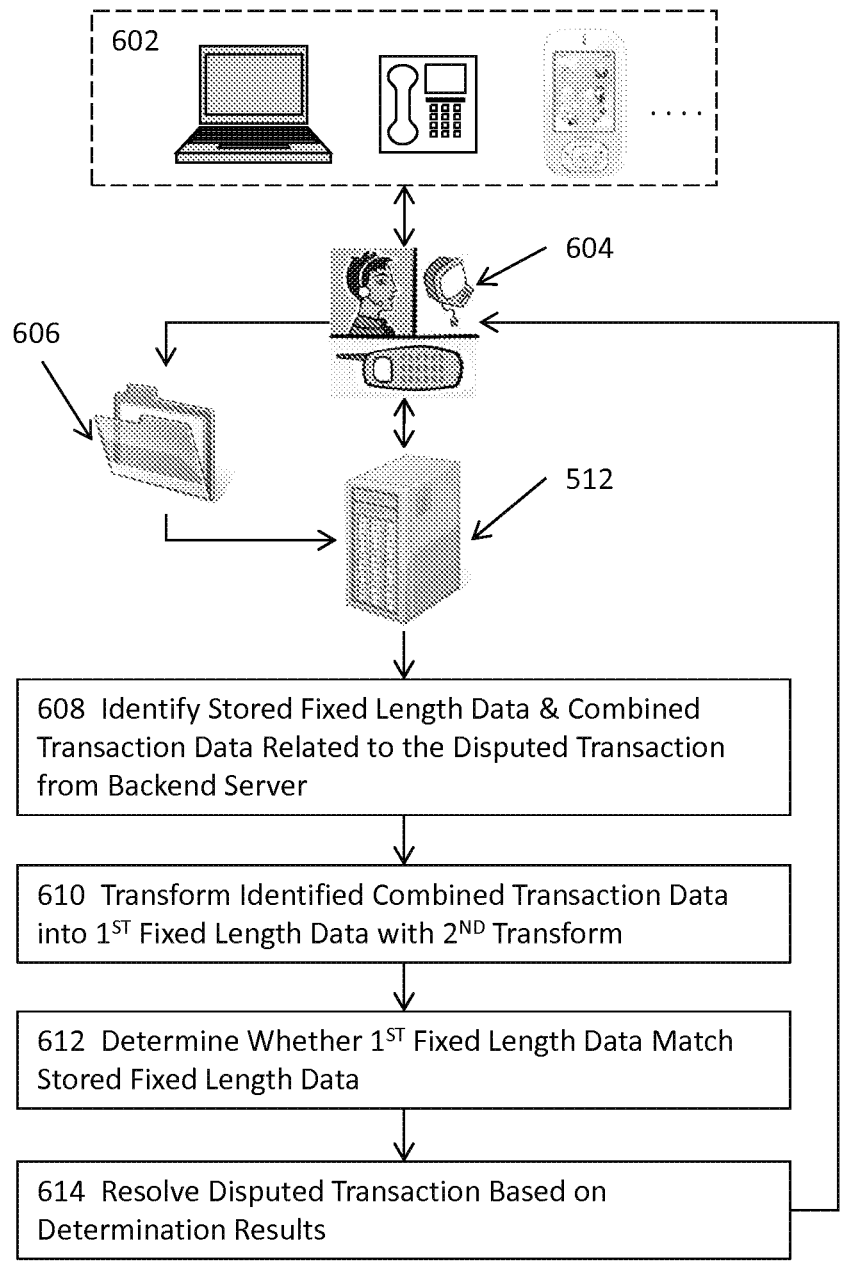
FIG. 6 illustrates a flow diagram for using captured signatures of charge card transactions for transaction dispute resolution in some embodiments.

FIG. 6 illustrates a flow diagram for using captured signatures of charge card transactions for transaction dispute resolution in some embodiments. In these embodiments illustrated in FIG. 6, the method or system may first receive a request for dispute resolution at 604 from a buyer via various communication means 602 including telephonic devices, computing systems, or mobile communication devices, etc. A re-arranged (e.g., an rearrangement from a telephone call to an electronic form, etc.) request for dispute resolution 606 may be forwarded to a computing system 512 which may identify the stored fixed length data entry and/or at least a part of the stored transaction information (e.g., the combined transaction data obtained at 506) related to the transaction in dispute from a backend server at 608.

It shall be noted that the computing system may be the backend server in some embodiments. At 610, the method or system may transform the identified at least a part of the transaction information into a first fixed length data entry by using a second transform that was also used to obtain the stored fixed length data entry. The method or system may then determine whether the first fixed length data entry matches the stored fixed length data entry at 612 and, at 614, resolve the transaction in dispute or respond to the request for dispute resolution based at least in part upon the determination results obtained at 612. More details about resolving request for dispute resolution are described above with reference to FIG. 4B.

Figure 7:
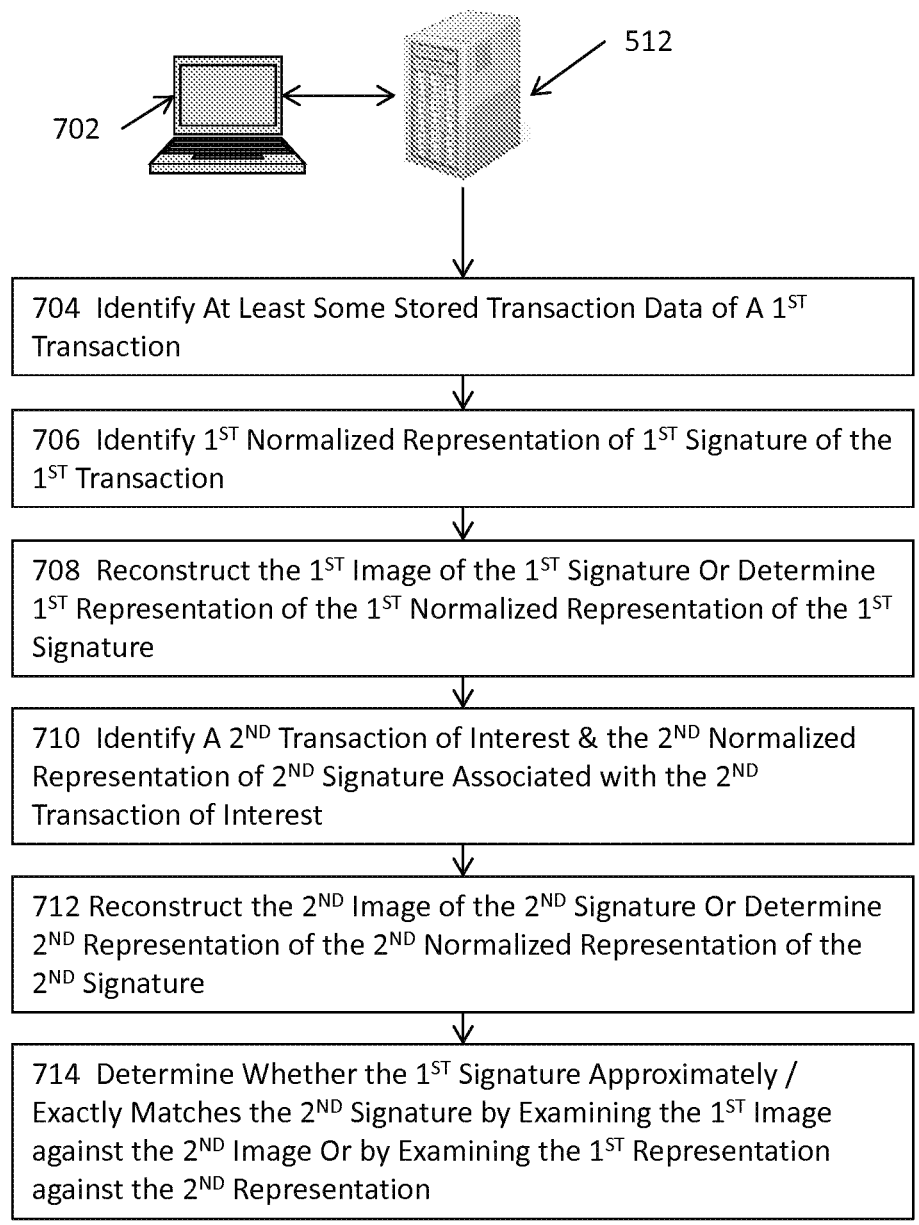
FIG. 7 illustrates a flow diagram for identifying similar transactions of a cardholder using captured signatures of charge card transactions in some embodiments.

FIG. 7 illustrates a flow diagram for identifying similar transactions of a cardholder using captured signatures of charge card transactions in some embodiments. In these embodiments illustrated in FIG. 7, a computing system 702 may be operatively coupled to another computer system 512 (e.g., the backend server 114 in FIG. 1) to perform various transaction classification or fraud investigation or detection tasks. At 704, the method or system may identify at least some stored transaction information of a first transaction. In some embodiments, the first transaction includes a known, valid transaction paid for by a charge card of a cardholder. In some other embodiments, the first transaction includes a known, fraudulent transaction associated with an invalid signature (e.g., a forged or invalid signature).

The method or system may identify a first normalized representation of a first signature of the first transaction at 706. In some embodiments, the method or system may optionally reconstruct the first image of the first signature for the first transaction or determine a first representation of the first normalized representation at 708. The reconstructed first image of the first signature may include a computer image of the signature that is derived from the first normalized representation of the first signature. The first representation of the first normalized representation may include a mathematical representation or expression of the first normalized representation in some embodiments.

For example, the first representation may include a linear, quadratic, cubic or higher-order Bezier curve, an n-th order polynomial, etc. of the first normalized representation including absolute or relative coordinates of various beginning points and waypoints of the first signature. At 710, the method or system may identify a second transaction of interest and the second normalized representation of the second signature associated with the second transaction of interest. In these embodiments, the method or system is to determine whether or not the second transaction may be classified into the same class or category as the first transaction. At 712, the method or system may optionally reconstruct the second image of the second signature for the second transaction or determine a second representation of the second normalized representation at 712.

The reconstructed second image of the second signature may include a computer image of the second signature that is derived from the second normalized representation of the second signature. The second representation of the second normalized representation may include a mathematical representation or expression of the second normalized representation in some embodiments. For example, the second representation may include a linear, quadratic, cubic or higher-order Bezier curve, an n-th order polynomial, etc. of the second normalized representation including absolute or relative coordinates of various beginning points and waypoints of the second signature.

At 714, the method or system may determine whether the first signature exactly or approximately matches the second signature by examining the first image against the second image, by examining the first representation against the second representation, or by analyzing the first normalized representation against the second normalized representation in substantially similar manners as those described for FIGS. 4B-C above. In some embodiments where the determination result is affirmative, the method or system may classify the first transaction and the second transaction into the same class or category. Otherwise, the method or system may classify the first transaction and the second transaction into different classes or categories.

Figure 7A:
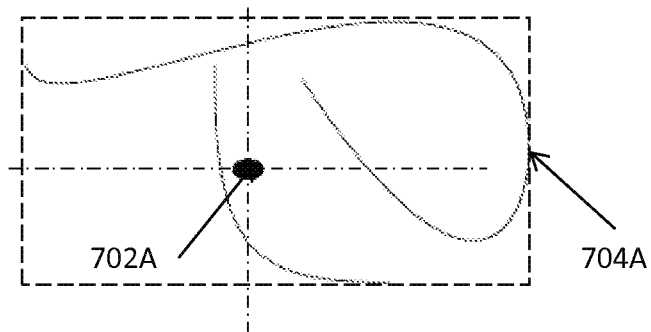
FIG. 7A shows an illustrative signature in its entirety with an assigned coordinate system having an origin and an optional bounding box for the signature in some embodiments.
Figure 7B:
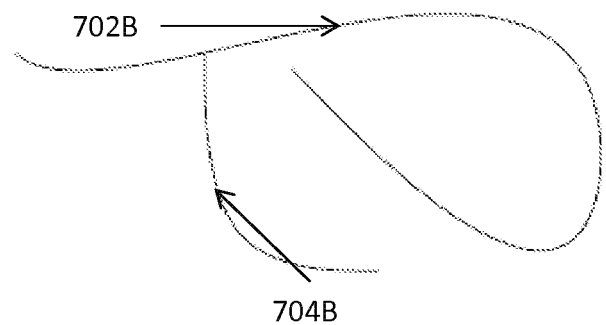
FIG. 7B illustrates two strokes of the signature shown in FIG. 7A.
Figure 7C:
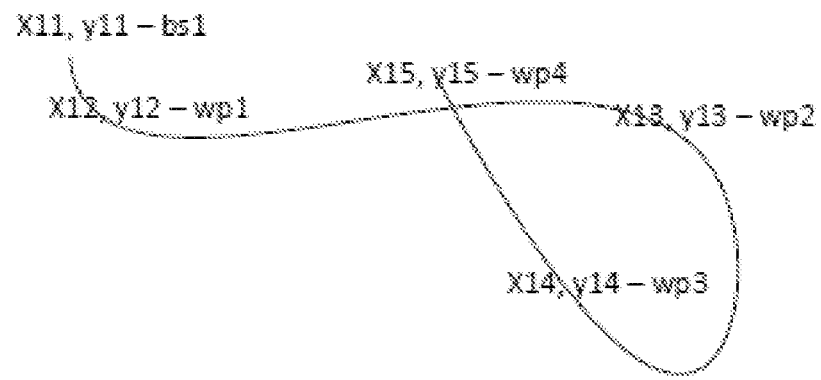
FIG. 7C illustrates the beginning point and four waypoints for the first stroke illustrated in FIG. 7B.
Figure 7D:
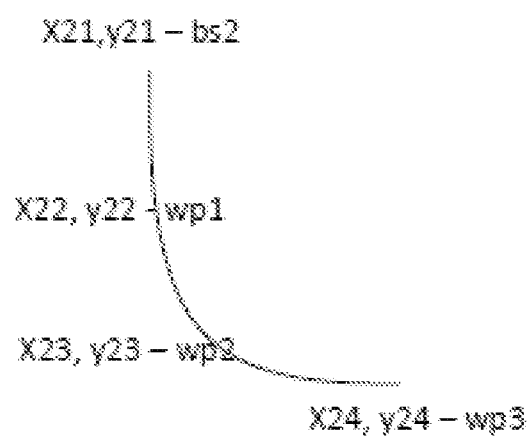
FIG. 7D illustrates the beginning point and three waypoints for the second stroke illustrated in FIG. 7B.

FIG. 7A shows an illustrative signature in its entirety with an assigned coordinate system having an origin 702A in some embodiments. FIG. 7A also illustrates the optional bounding box 704A for the signature. FIG. 7B illustrates that the method or system may identify the two strokes of the signature, where 702B represents the first stroke, and 704B indicates the second stroke in some embodiments. FIG. 7C illustrates the beginning point of stroke (x11, y11-bs1) and the four waypoints for the first stroke. The four waypoints may be represented as (x12, y12-wp1), (x13, y13-wp2), (x14, y14-wp3), and (x15, y15-wp4). FIG. 7D illustrates the beginning point of stroke (x21, y21-bs2) and the three waypoints for the second stroke illustrated in FIG. 7B.

The three waypoints may be represented as (x22, y22-wp1), (x23, y23-wp2), and (x24, y24-wp3). Each X-coordinate of a point (e.g., beginning point and/or waypoint) may be represented with a first fixed length data. Similarly, each Y-coordinate of a point may also be represented with a second fixed length data. It shall be noted that X-coordinates and Y-coordinates need not be represented with the same length of data. For example, the X-coordinate of a point may be represented as four-bit, a one (1)-byte, two (2)-byte, or other length data. Similarly, the Y-coordinate of a point may be represented as four-bit, a one (1)-byte, two (2)-byte, or other length data.

FIG. 7E illustrates a simplified data structure including some entries of information or data of transactions in some embodiments. More specifically, FIG. 7E illustrates a simplified data structure including an illustrative normalized representation of a signature shown in FIGS. 7A-D and other information or data of the pertinent transaction. In these illustrated embodiments, the method or system may store a normalized representation of the signature illustrated in FIGS. 7A-D in the form of a bytestream representation in, for example, the first column of the illustrated data structure. The illustrative bytestream representation of the signature includes the coordinates of the beginning point of the first stroke (e.g., x11, y11 or x21, y21), various waypoints along the strokes (e.g., x12, y12, x13, y13, x14, y14, x15, y15 or x21, y21, x22, y22, x23, y23, x24, y24).

Note that in this illustrated data structure, the method or system uses "0, 0" to indicate the end of a stroke in the signature. The illustrative data structure may also include other information or data about the transaction such as date and time about the transaction, information (e.g., description, quantity per item, amount per item, etc.) about the product or service item(s) purchased in the transaction, information about the seller, charge card information (e.g., masked charge card number), monetary information (e.g., the sub-total, sales tax, tip, etc.) of the transaction, transaction identifier (e.g., an Electronic Data Capture or EDC transaction ID), or any other suitable information.

Figure 7F:
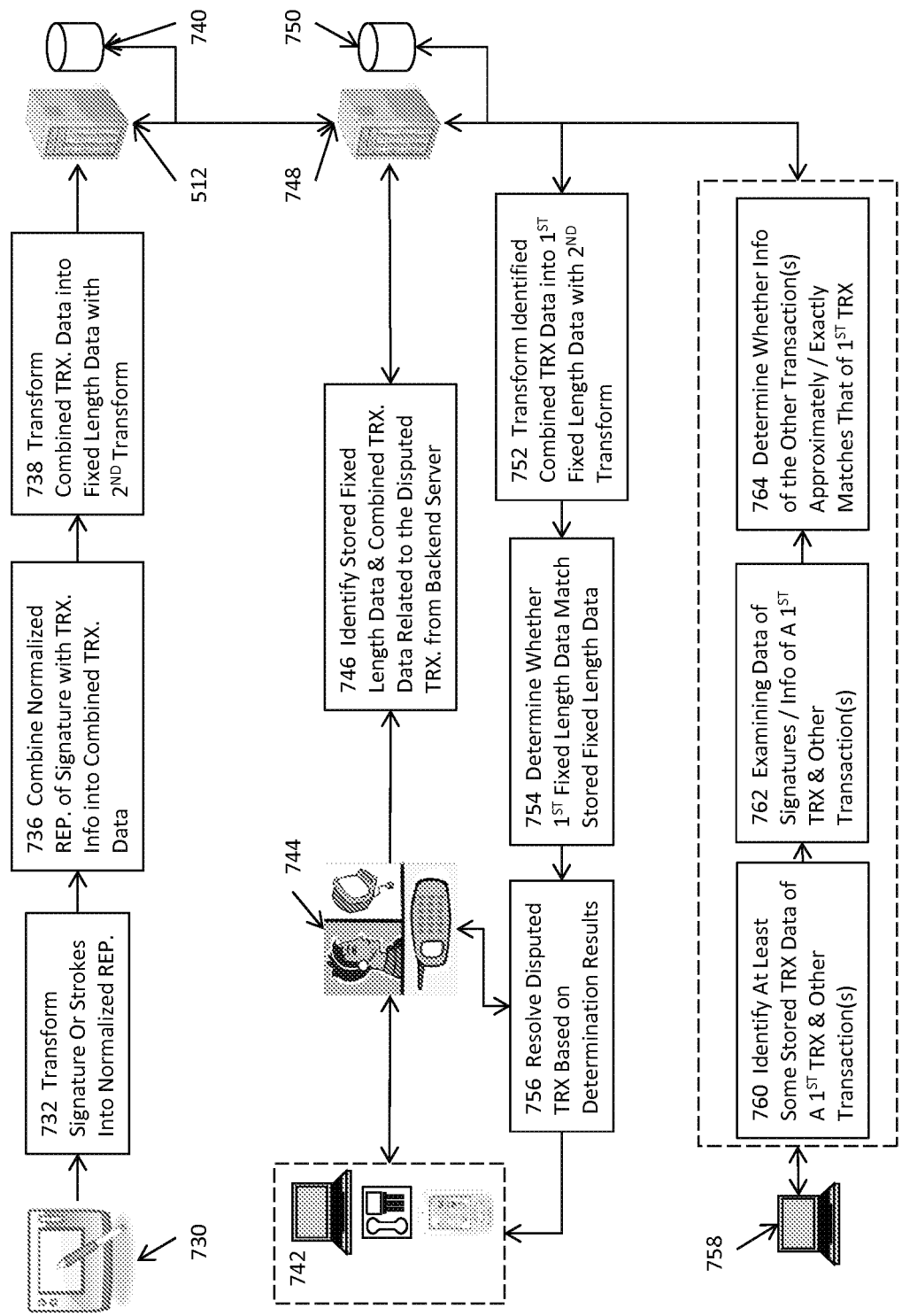
FIG. 7F illustrates a schematic flow diagram showing how embodiments may be utilized as components of an integrated system.

FIG. 7F illustrates a schematic flow diagram of multiple systems executing various functions in tandem described in this Application in some embodiments. In these embodiments illustrated in FIG. 7F, the mobile communication device 730 may receive or identify, for example, the cardholder signature and transaction information about a transaction (TRX in FIG. 7F) between the seller and the cardholder of a charge card used to pay for the transaction. The method or system may capture or transform the signature or one or more strokes thereof into one or more normalized representations (REP in FIG. 7F) by using a first transform at 732.

For example, the method or system may capture or transform the cardholder's signature into a normalized bytestream as previously described. At 736, the method or system may optionally combine the normalized one or more representations of the cardholder's signature with at least some transaction information (e.g., transaction date, transaction time, transaction identification, etc.) to form combined transaction data. The method or system may then transform the combined transaction data into a fixed length data entry by using a second transform at 738. For example, the method or system may use a hash function to hash the combined transaction data into a fixed length data entry at 738. The transaction information, the one or more normalized representations, the combined transaction data, the fixed length data, or any combination thereof may be stored on the mobile communication device 730 and/or transmitted to a remote computing system 512 that is operatively coupled to a storage device 740 for storage in one or more data structures.

The method or system illustrated in FIG. 7F may further receive a request for dispute resolution at 744 from a buyer via various communication means 742 including telephonic devices, computing systems, or mobile communication devices, etc. The method or system may further forward a re-arranged (e.g., an rearrangement from a telephone call to an electronic form, etc.) request for dispute resolution to a computing system 748 which may be coupled to a storage device 750 and may further identify the stored fixed length data entry and/or at least a part of the stored transaction information (e.g., the combined transaction data obtained at 736) related to the transaction in dispute from a backend server at 746.

It shall be noted that the computing system 748 and the computing system 512 may be the same computing system or two or more separate computing systems. Similarly, the storage device 740 and the storage device 750 may be the same storage device or may be two different storage devices. At 752, the method or system may transform the identified at least a part of the transaction information into a first fixed length data entry by using a second transform that was also used to obtain the stored fixed length data entry. The method or system may then determine whether the first fixed length data entry matches the stored fixed length data entry at 754 and, at 756, resolve the transaction in dispute or respond to the request for dispute resolution based at least in part upon the determination results obtained at 754.

The response or results of resolving the transaction in dispute may be transmitted to the complainant or the buyer directly from the computing system 748 or from the dispute resolution unit at 744 via communication means 742. In some embodiments, the method or system may further utilize a computing system 758 to identify a first transaction and at least some stored transaction data thereof as well as one or more other transactions at 760. In some embodiments, the first transaction includes a known, valid transaction paid for by a charge card of a cardholder. In some other embodiments, the first transaction includes a known, fraudulent transaction associated with an invalid signature (e.g., a forged signature). The at least some stored transaction data may include, for example, the normalized representations of the signatures for the first transaction and the one or more other transactions and/or any other pertinent data that may be related to these transactions and may be used to classify or categorize the one or more other transactions into the same category or class as the first transaction.

The method or system may then examine the data of the signatures, information, and/or data of the transactions (e.g., the first transaction and the one or more other transactions) at 762 in substantially similar manners as those described for FIG. 7 and determine whether the examined information or data of the one or more other transactions exactly or approximately match the corresponding information or data of the first transaction at 764 in substantially similar manners as those described for FIG. 7. In some embodiments where the examined information or data of the one or more other transactions exactly or approximately match the corresponding information or data of the first transaction, the method or system may categorize or classify the one or more other transactions into the same category or class as the first transaction.

For example, if the first transaction constitutes a known, fraudulent transaction, the method or system may also categorize or classify these one or more other transactions as known, fraudulent transactions. In some embodiments where the examined information or data of the one or more other transactions do not exactly or approximately match the corresponding information or data of the first transaction, the method or system may categorize or classify the one or more other transactions into one or more different categories or classes from the first transaction.

Figure 8:
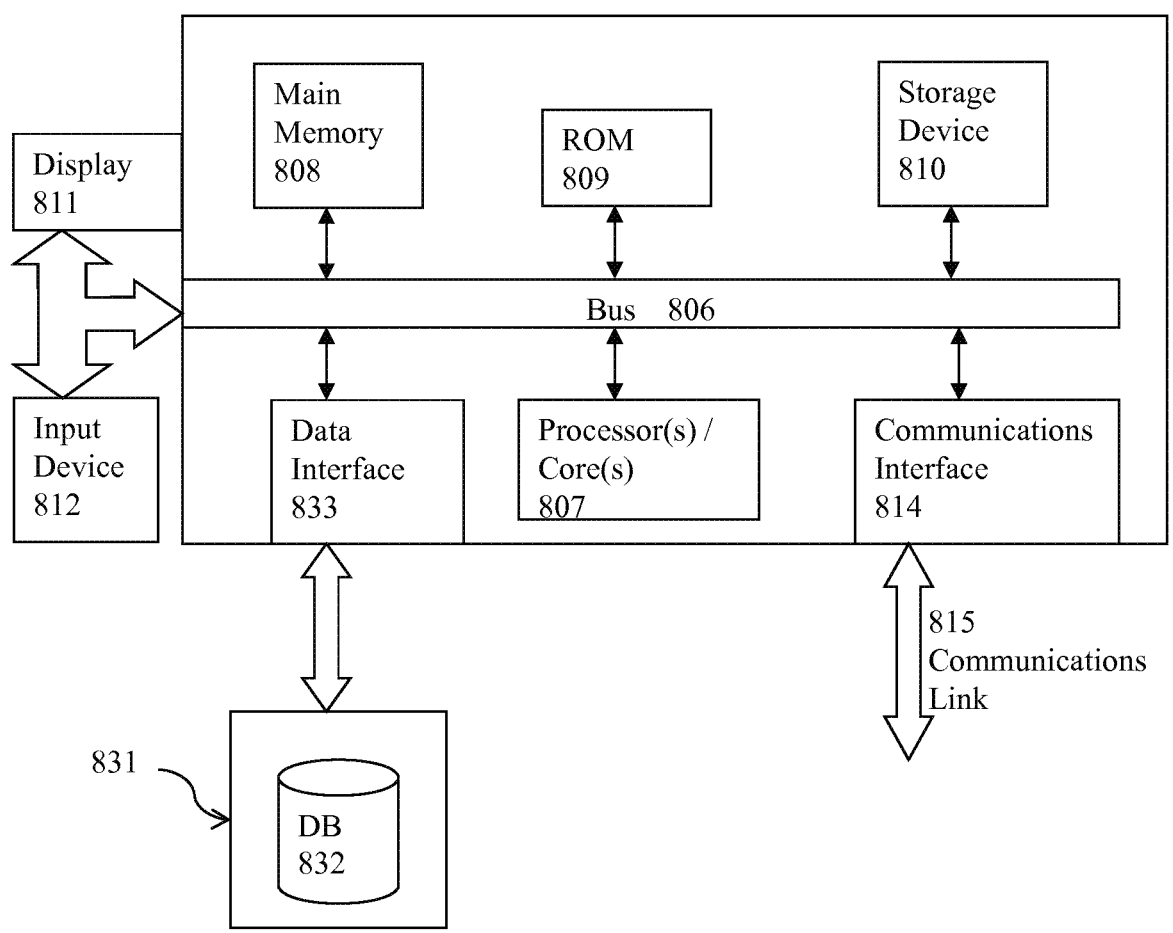
FIG. 8 illustrates a flow diagram of an illustrative computing system suitable for implementing various embodiments described herein.

FIG. 8 illustrates a block diagram of components of an illustrative computing system 800 suitable for implementing various embodiment of the invention. For example, the exemplary computing system 800 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 800 includes a bus 806 or other communication mechanism for communicating information, which interconnects subsystems and devices, such as processor 807, system memory 808 (e.g., RAM), static storage device 909 (e.g., ROM), disk drive 810 (e.g., magnetic or optical), communication interface 814 (e.g., modem or Ethernet card), display 811 (e.g., CRT or LCD), input device 812 (e.g., keyboard), and cursor control (not shown).

According to one embodiment of the invention, computer system 800 performs specific operations by one or more processors or processor cores 807 executing one or more sequences of one or more instructions contained in system memory 808. Such instructions may be read into system memory 808 from another computer readable/usable storage medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. In the single embodiment or in some embodiments, the one or more processors or processor cores 807 may be used to perform various actions such as various actions, processes, or modules involving determining, analyzing, performing actions, etc. In some embodiments, at least one of the one or more processors or processor cores 807 has the multithreading capability.

In one embodiment, the term "logic" shall mean any combination of software or hardware that is used to implement all or part of the invention. In the single embodiment or in some embodiments, the one or more processors or processor cores 807 may be used to perform various acts such as various acts involving determining, analyzing, performing actions, etc. In some embodiments, at least one of the one or more processors or processor cores 807 has the multithreading capability to execute a plurality of threads to perform various tasks as described in the preceding sections.

Various actions as described in the preceding paragraphs may be performed by using one or more processors, one or more processor cores, or combination thereof 807. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 900. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. In an embodiment, the computer system 800 operates in conjunction with a data storage system 831, e.g., a data storage system 831 that includes a database 832 that is readily accessible by the computer system 800. The computer system 800 communicates with the data storage system 831 through a data interface 833. A data interface 933, which is coupled to the bus 806, transmits and receives electrical, electromagnetic or optical signals that include data streams representing various types of signal information, e.g., instructions, messages and data. In embodiments of the invention, the functions of the data interface 833 may be performed by the communication interface 814.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense.

Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. It shall also be noted that although various examples described or drawings illustrated herein refer to a merchant's pairing a mobile communication device (e.g., a cellular phone) with a wireless peripheral (e.g., a wireless transaction card reader), various aspects described apply with full and equal effects to any users who are pairing their mobile communication devices to various types of wireless peripherals. Therefore, the reference to a merchant or a wireless transaction card reader are not intended to and shall not be interpreted as limiting the scope of the application or the scope of the claims, unless otherwise specifically recited or claimed.

Accordingly, embodiments are intended to exemplify alternatives, modifications, and equivalents that may fall within the scope of the claims.

The invention claimed is:

1. A machine implemented method for capturing and processing electronic signatures, the method being performed by at least a mobile communication device and comprising:
   the mobile communication device identifying, at a touch screen included in or operatively coupled to the mobile communication device, a transaction and transaction information, the transaction information comprising product or service information related to a transaction between a user and an entity and a signature of the user;
   the mobile communication device executing a first transformation of the signature into one or more representations of the signature;
   the mobile communication device reducing computational complexities of analyzing the signature at least by executing at least one second transformation of a combination of the one or more representations and at least some of the transaction information into a fingerprint having a fixed length; and
   transmitting the one or more representations and the at least some of the transaction information from the mobile communication device to a remote server for storage in a repository via a computer network.

2. The machine implemented method of claim 1, further comprising performing, at a remote server, one or more operations on the fingerprint and one or more other fingerprint having the fixed length, wherein the one or more representations of the signature comprise a bytestream of coordinate data along one or more strokes of the signature, and the one or more operations comprising at least one classification operation, fraud detection operation, or dispute resolution operation, or one or more combinations thereof.

3. The machine implemented method of claim 1, further comprising the mobile communication device:
   identifying a first stroke of the signature;
   identifying or determining beginning coordinates of a beginning point of the first stroke;
   identifying or determining a first waypoint of the first stroke; and
   identifying or determining first waypoint coordinates of the first waypoint.

4. The machine implemented method of claim 3, the mobile communication device identifying or determining the first waypoint further comprising the mobile communication device:
   identifying or determining a first temporal interval;
   identifying or determining a beginning time point for the beginning point; and
   identifying or determining the first waypoint along the first stroke after the first temporal interval from the beginning time point.

5. The machine implemented method of claim 3, the mobile communication device identifying or determining the first waypoint further comprising the mobile communication device:
   examining a curvature or linearity of the first stroke; and
   identifying or determining the first waypoint along the first stroke based at least in part upon the curvature, the linearity, or a change in the curvature or linearity of the first stroke.

6. The machine implemented method of claim 1, further comprising the mobile communication device:
   segmenting the signature into a plurality of strokes including a first stroke; and
   identifying or determining coordinates of a start point of the first stroke and coordinates of a first waypoint of the first stroke.

7. The machine implemented method of claim 1, further comprising the mobile communication device normalizing the signature that is entered on an electronic visual display of the mobile communication device.

8. The machine implemented method of claim 7, the mobile communication device normalizing the signature further comprising the mobile communication device:
   assigning a coordinate system including an origin for the signature; and
   assigning a unit of measurement to at least one of a horizontal axis and a vertical axis for the signature.

9. The machine implemented method of claim 7, the mobile communication device normalizing the signature further comprising the mobile communication device:
   determining a bounding box for the signature or for a signature field;
   determining a scaling factor by using the bounding box and a predetermined size or dimension for the bounding box; and
   normalizing the signature by applying the scaling factor to the one or more representations of the signature.

10. The machine implemented method of claim 1, further comprising the mobile communication device:
    executing a hash function with inputs comprising the one or more representations of the signature and at least some of the transaction information; and
    generating a fixed length fingerprint of the signature for the fingerprint of the signature, the first transformation comprising a temporal signature acquisition process that converts the signature received at the touch screen into at least one of the one or more representations based on a temporal sequence.

11. The machine implemented method of claim 1, further comprising the mobile communication device transmitting the one or more representations of the signature, the at least some of the transaction information, and the fingerprint of the signature to a remote computing system, the remote computing system storing the one or more representations of the signature, the at least some of the transaction information, and the fingerprint of the signature in a non-transitory machine readable medium for the transaction.

12. The machine implemented method of claim 11, further comprising the remote computing system:
    receiving a request for dispute resolution for the transaction;

retrieving the one or more representations of the signature and the at least some of the transaction information for the transaction stored in the non-transitory machine readable medium; and
retrieving the fingerprint of the signature stored in the non-transitory machine readable medium for the transaction.

13. The machine implemented method of claim 12, further comprising the remote computing system:
generating a first fingerprint of the signature by transforming the one or more representations of the signature and the at least some of the transaction information by using the at least one second transformation, the at least one second transformation also being used to transform the one or more representations and at least some of the transaction information into the fingerprint of the signature;
comparing the first fingerprint of the signature with the fingerprint of the signature stored in the non-transitory machine readable medium; and
responding to the request for dispute resolution based at least in part upon comparison results.

14. The machine implemented method of claim 1, further comprising
the mobile communication device transmitting the one or more representations of the signature, the at least some of the transaction information, and the fingerprint of the signature to a remote computing system; and
the remote computing system determining whether a first transaction and the transaction are to be classified into a same category or a different category.

15. The machine implemented method of claim 14, the remote computing system determining whether a first transaction and the transaction are to be classified into a same category or a different category further comprising the remote computing system:
identifying one or more first representations of a first signature for the first transaction;
examining the one or more first representations of the first signature and the one or more representations of the signature; and
determining whether the one or more first representations of the first signature exactly or approximately match the one or more representations of the signature.

16. The machine implemented method of claim 14, the remote computing system determining whether a first transaction and the transaction are to be classified into a same category or a different category further comprising the remote computing system:
identifying one or more first representations of a first signature for the first transaction;
reconstructing the first signature by using at least the one or more first representations of the first signature for the first transaction;
reconstructing the signature by using at least the one or more representations of the signature for the transaction;
examining the first signature and the signature; and
determining whether the first signature exactly or approximately matches the signature.

17. The machine implemented method of claim 14, the remote computing system determining whether a first transaction and the transaction are to be classified into a same category or a different category further comprising the remote computing system:
identifying one or more first representations of a first signature for the first transaction;
identifying or determining a first expression for the one or more first representations of the first signature for the first transaction;
identifying or determining an expression for the one or more representations of the signature for the transaction, wherein the first expression includes a first mathematical expression, and the expression includes a second mathematical expression; and
determining whether the first expression exactly or approximately matches the expression.

18. A system for capturing and processing electronic signatures, the system comprising:
a mobile communication device comprising a processor configured to execute a sequence of instructions to:
identify, at a touch screen included in or operatively coupled to the mobile communication device, a transaction and transaction information, the transaction information comprising product or service information related to a transaction between a user and an entity and a signature of the user;
execute a first transformation of the signature into one or more representations of the signature;
reduce computational complexities of analyzing the signature at least by executing a second transformation of a combination of the one or more representations and at least some of the transaction information into a fingerprint having a fixed length; and
transmit the one or more representations and the at least some of the transaction information from the mobile communication device to a remote server for storage in a repository via a computer network.

19. The system of claim 18, the processor of the mobile communication device being further operable to:
identify or determine a first stroke of the signature;
identify or determine beginning coordinates of a beginning point of the first stroke;
identify or determine a first waypoint for the first stroke; and
identify first waypoint coordinates for the first waypoint.

20. The system of claim 18, the processor of the mobile communication device being further operable to:
execute a hash function with one or more inputs comprising the one or more representations of the signature and at least some of the transaction information; and
generate a fixed length fingerprint of the signature for the fingerprint of the signature, the first transformation comprising a temporal signature acquisition process that converts the signature received at the touch screen into at least one of the one or more representations based on a temporal sequence.

21. The system of claim 18, the processor of the mobile communication device being further operable to:
transmit the one or more representations of the signature, the at least some of the transaction information, and the fingerprint of the signature to a remote computing system;
determine whether a first transaction and the transaction are to be classified into a same category or a different category;
identify one or more first representations of a first signature for the first transaction;
examine the one or more first representations of the first signature and the one or more representations of the signature; and
determine whether the one or more first representations of the first signature exactly or approximately match the one or more representations of the signature.

22. A computer program product comprising a non-transitory machine readable storage medium having stored thereupon a sequence of instructions which, when executed by a mobile communication device, causes the mobile communication device to perform a process for capturing and processing electronic signatures comprising:

identifying, at a touch screen included in or operatively coupled to the mobile communication device, an electronic interaction and interaction information, the interaction information comprising at least a signature of the user;

executing a first transformation of the signature into one or more representations for the signature;

reducing computational complexities of analyzing the signature at least by executing a second transformation of a combination of the one or more representations and at least some of the interaction information into a fingerprint having a fixed length; and transmitting the one or more representations and the at least some of the interaction information from the mobile communication device to a remote server for storage in a repository via a computer network.

23. The computer program product of claim 22, wherein the one or more representations captured for the signature comprise a bytestream of coordinate data along one or more strokes of the signature.

24. The computer program product of claim 22, the process further comprising:

identifying or determining a first stroke of the signature;
   identifying or determining beginning coordinates of a beginning point of the first stroke;
   identifying or determining a first waypoint for the first stroke; and
   identifying or determining first waypoint coordinates for the first waypoint.

25. The computer program product of claim 22, the process further comprising:

executing a hash function with one or more inputs comprising the one or more representations of the signature and at least some of the interaction information;

generating a fixed length fingerprint of the signature for the fingerprint of the signature, wherein the first transformation comprises a temporal signature acquisition process that converts the signature received at the touch screen into at least one of the one or more representations based on a temporal sequence.

* * * * *